US011931747B2

(12) United States Patent
Niemoller

(10) Patent No.: US 11,931,747 B2
(45) Date of Patent: Mar. 19, 2024

(54) APPARATUS, METHOD AND PROCESS FOR THE RECOVERY OF MINERALS

(71) Applicant: FINETECH MINERALS PROPRIETARY LIMITED, Bryanston (ZA)

(72) Inventor: Rudy Niemoller, Pretoria (ZA)

(73) Assignee: FINETECH MINERALS PROPRIETARY LIMITED, Bryanston (ZA)

( * ) Notice: Subject to any disclaimer, the term of this patent is extended or adjusted under 35 U.S.C. 154(b) by 0 days.

(21) Appl. No.: 17/997,921

(22) PCT Filed: May 3, 2021

(86) PCT No.: PCT/IB2021/053682
§ 371 (c)(1),
(2) Date: Nov. 3, 2022

(87) PCT Pub. No.: WO2021/224758
PCT Pub. Date: Nov. 11, 2021

(65) Prior Publication Data

US 2023/0191425 A1 Jun. 22, 2023

(30) Foreign Application Priority Data

May 4, 2020 (ZA) ................................ 2020/01957

(51) Int. Cl.
*B03B 5/62* (2006.01)

(52) U.S. Cl.
CPC ................................... *B03B 5/623* (2013.01)

(58) Field of Classification Search
CPC .. B03B 5/623; B03B 5/60; B03B 5/62; B03B 5/68; B03B 5/28; B03B 5/30; B03B 5/64; B03B 7/00; B03B 9/00; B03B 11/00
USPC ................................ 209/132, 155, 158, 159
See application file for complete search history.

(56) References Cited

U.S. PATENT DOCUMENTS 2,708,517 A * 5/1955 Evans ..................... B03B 5/623 209/454
3,550,773 A * 12/1970 Klibanoff ................ B03B 5/623 209/154
3,867,197 A * 2/1975 Reinhardt ................. C09C 3/06 422/150
4,399,027 A * 8/1983 Miller ....................... B04C 5/10 209/730
4,784,757 A * 11/1988 Nelson .................... B03B 5/623 209/159
4,913,803 A * 4/1990 Earls ....................... B03B 5/623 209/159
4,961,843 A * 10/1990 Lewis ..................... B03B 5/623 209/210
(Continued)

FOREIGN PATENT DOCUMENTS

DE 102 20 813 A1 10/2003
DE 10220813 A1 * 10/2003 ............ B03B 5/623
(Continued)

*Primary Examiner* — Gene O Crawford
*Assistant Examiner* — Muhammad Awais
(74) *Attorney, Agent, or Firm* — Seed IP Law Group LLP

(57) ABSTRACT

This invention relates to an inverted up-flow separator, its use in a method of recovering target mineral particles from tailings and a process for the recovery of target mineral particles from tailings using the inverted up-flow separator of the invention.

14 Claims, 2 Drawing Sheets

(56) References Cited

U.S. PATENT DOCUMENTS

2016/0096735 A1* 4/2016 Savsunenko ............ C01B 32/19
209/132
2018/0015479 A1* 1/2018 Richmond .............. B03B 13/00

FOREIGN PATENT DOCUMENTS

WO WO-2010074051 A1 * 7/2010 ............. B03B 5/623
WO WO-2019175034 A1 * 9/2019 ............. B01D 21/00

* cited by examiner

APPARATUS, METHOD AND PROCESS FOR THE RECOVERY OF MINERALS

FIELD OF THE INVENTION

This invention relates to apparatus, a method and a process for the recovery of one or more selected mineral commodities from tailings (historic or current), at a commercially acceptable concentration, in a recovered product obtained using the apparatus, method and process of the invention. More specifically the invention relates to an inverted up-flow separator and its use in the aforesaid method and process.

BACKGROUND TO THE INVENTION

The processing and recovery of mineral commodities from tailings has significant economic value.

The commercial economic value in the recovery of one or more target minerals is naturally dependent upon the concentration of the target mineral that may be recovered, in this case, from tailings and the concentration of the target mineral in a recovered product. The latter's economic value, in turn, is influenced by the cost associated with the extraction, separation and recovery of the target mineral from tailings. It stands to reason therefore that the economic value of the target minerals recovered from the tailings is partly dependent upon the efficiency and efficacy of the process employed to recover such target mineral and/or the apparatus used.

Without wishing to be bound by principles of economics, each mineral commodity has an associated mineral ore grade below which it will not be profitable to extract, process and recover.

In the case of recovering target minerals from tailings, should the recovered product from a separation of such target minerals from gangue not produce an acceptable ore grade, then the recovered product will not be useful for further processing for one or more applications. By way of example, insofar as chromium is concerned, a mineral ore grade of less than 40% (wt) $Cr_2O_3$ in a recovered product from tailings is insufficient to make the recovered product commercially valuable to further process for one or more applications. Other target minerals will have different mineral ore grades. For example, a mineral ore grade of at least 72% (wt) of $SnO_2$ is required to further process a recovered product to further process into tin.

It will be appreciated that the skilled person would know what mineral ore grade is required for a specific target mineral in order that the recovered product has a commercially acceptable concentration of that mineral to make it commercially viable.

A conventional method of recovering target minerals, from run of mine ore (ROM), for example, is to first pass the ore through a process of crushing, grinding and sizing (i.e. liberation of target minerals from ore wherein sizing is used as a proxy for whether liberation has occurred sufficiently or not), and thereafter the liberated target mineral particles and gangue particles resulting from the liberation process are fed to one or more separators to recover as much of the target mineral particles as possible (the oversized ore being sent back to the mill for further crushing and grinding).

The at least one or more separators separate the liberated target mineral particles from the gangue particles into a product stream containing the bulk of the target mineral particles.

In those cases where the particle size of the liberated target mineral particles is too small to be properly separated from the gangue particles, said target mineral particles and gangue particles are sacrificed to tailings wherein the concentration of the target mineral in the gangue is not high enough to make the tailings commercially valuable i.e. the gangue does not contain a sufficient concentration of the target mineral to make it useful to industry and/or cannot further be processed, without difficulty, so as to recover the target mineral sacrificed to tailings.

A common drawback, therefore, of the recovery of target minerals from ROM, using the conventional method, is that target mineral particles having a particle size smaller than between 100 to 250 micro metres are often sacrificed to tailings and are not recovered.

Recovery of liberated target minerals may also take place by elutriation in an up-flow separator, where, during the elutriation process liberated target minerals are subject to an upward flowing current of fluid. Particle density (i.e. the specific gravity of the particle) is exploited thereby allowing for separation of particles into specific gravity-based underflow and overflow streams. It is thought that by using elutriation in an up-flow separator less liberated target minerals that are too small will be lost to tailings.

Allmineral's Allflux® classifier is an example of the type of equipment available in the market for purposes of elutriation. It includes an inner column (for separation of coarser material) within an outer column (for separation of finer material). Classifiers like the Allflux® suffer from the same disadvantage, namely that the fluid velocity is not constant across the sorting column, being a minimum at the walls of the column, and a maximum at the centre. Some coarse target minerals are therefore misplaced in the overflow, and some fine target minerals are misplaced into the underflow. The fractions thus have a considerable overlap in particle size and are not sharply separated. This disadvantage would be expected given that a classifier is being used as a separator.

The FL Smidth Reflux® Classifier is also well known for the separation of mineral commodities. Separation is based both on gravity and particle size.

The inherent problem with the FL Smidth Reflux® Classifier is that the lamella (multiple inclined plates) are located above the fluidised bed, which lamella are meant to suppress the effects of particle size in separation, by exposing the high specific gravity particles to drag on the lamella, so as to result in a more effective separation based on specific gravity. The disadvantage with the use of the lamella is a build-up of particles on the lamella. This build up lowers the capacity and efficiency of the separator and the recovery of the liberated target mineral.

OBJECT OF THE INVENTION

The object of the invention is to provide an apparatus, method and a process using the apparatus, to recover target minerals from tailings (current or historic) to produce a recovered product wherein the recovered product includes a commercially acceptable concentration of target minerals therein while minimising the disadvantages of current techniques for the recovery of said target minerals.

SUMMARY OF INVENTION

For purposes of this specification:

"Energy commodities" refer to fluid and solid fossil fuels used for power generation. This group encompasses oil, gas, coal and uranium (*).

"Fine minerals" means mineral commodities having particles with a particle size of below 1000 microns.

"Metallic commodities" are defined as solid materials containing an appropriate composition of metal ores to be extracted and used as a metal precursor or as a direct raw material for manufacturing. They are categorized as either ferrous, light, precious or base metals.

"Mineral Commodities" are non-renewable resources classified as energy, metallic and non-metallic.

"Non-metallic commodities" are defined as those minerals that do not contain recoverable metals. The group includes (among others) phosphate rocks, metallurgical coal, potash, salts, clays, sands, boron, and crushed and broken stones such as limestone and granite (*).

(*—Cortez C. A. et al, International Journal of Mining Science and Technology, 28 (2018), 309-322).

"Target mineral" refers to one or more mineral commodities selected from the group consisting of metallic commodities and energy commodities. The target mineral is that which is sought to be recovered by the apparatus, method and process described and claimed herein.

"Ultra-fine minerals" means mineral commodities having particles with a particle size of below 125 microns.

According to the present invention there is provided an inverted up-flow separator for the separation and recovery of target minerals from a feed including particulate matter, which in turn includes target mineral particles and gangue particles, the inverted up-flow separator including:

(a) an upper column in fluid flow communication with a lower column, (b) the lower column having a recovered product outlet for a recovered product, and (c) the upper column having a diameter greater than a diameter of the lower column.

The feed may include particulate matter and fluid. The particulate matter, in turn, includes target mineral particles to be separated and recovered from the gangue particles by the inverted up-flow separator.

The feed may be sourced from current tailings derived from ROM ore that has been liberated by one or more techniques selected from crushing, grinding and sizing.

The feed may also be sourced from historic tailings originating from the operation of mineral processing plants.

The target mineral particles in the feed have a particle size of from 10 to 150 micrometres.

A feed inlet may extend into the upper column of the inverted up-flow separator thereby to introduce the feed into the inverted up-flow separator. In order to improve the flowability of the feed, the feed may include a fluid such as water or a fluid such as water may be added to the feed as it enters the upper column.

The apparatus further includes at least one working fluid inlet in the lower column, the at least one working fluid inlet being in fluid flow communication with a fluid supply means. The inverted up-flow separator is configured to be filled with a fluid. The inverted up-flow separator is filled with fluid from the fluid supply means which is introduced into the inverted up-flow separator through the at least one working fluid inlet in the lower column. This may be done in conjunction with the fluid in the feed or with the addition of fluid to the feed.

The fluid, which is introduced into the inverted up-flow separator through the at least one working fluid inlet in the lower column may also be used to fluidise the particles of feed in the inverted up-flow separator.

The fluid is used to fluidise the particles of feed in the inverted up-flow separator by providing an up flow of fluid in the inverted up-flow separator from the lower column to the upper column, the lower and upper columns being dimensioned and configured such that the working fluid imparts upon the particulate matter in the lower column a first up flow velocity and a second up flow velocity on the particulate matter in the upper column, wherein the first up flow velocity is greater than the second up flow velocity.

It will be appreciated, without departing from the spirit and scope of the invention, that the at least one working fluid inlet need not serve both functions as described herein and the filling of the apparatus and provision of an up flow working fluid may be achieved through separate fluid inlets.

According to an embodiment of the invention there is provided an inverted up-flow separator for the separation and recovery of target minerals from a feed including particulate matter which comprises target mineral particles and gangue particles, the inverted up-flow separator including:

(a) at least one working fluid inlet; an upper column; a feed inlet, for a feed including particulate matter which comprises target mineral particles and gangue particles, into the upper column; a lower column; a recovered product outlet; the upper column and lower column being in fluid flow communication with each other; a connecting member, connecting the upper column and lower column; and wherein:

(b) the upper column has a greater diameter than a diameter of the lower column; and (c) the upper column and lower column are configured and dimensioned such that upon introduction of an up-flow working fluid into the lower column, through the at least one working fluid inlet, the particulate matter in the inverted up-flow separator, when filled with fluid, is fluidised thereby imparting a first up-flow velocity (V1) to the particulate matter in the lower column and a second up-flow velocity (V2) to the particulate matter in the upper column, wherein the first up-flow velocity (V1) is greater than the second up-flow velocity (V2).

The connecting member of the invention has a frusto-conical shape, defining an inner volume therein which is between the upper column and the lower column to which it is connected.

The feed inlet may extend into the upper column. The feed inlet includes a feed outlet.

The feed outlet preferably terminates at or near where the connecting member and upper column connect. Preferably the feed is discharged into the inner volume defined by the connecting member.

In an embodiment of the invention, the feed may comprise particulate matter including liberated target minerals and gangue particles from ROM ore that has been crushed and/or ground and/or sized.

In another embodiment of the invention, the feed comprises particulate matter in the form of tailings, including target mineral particles, from a preceding inefficient separation of liberated minerals and gangue.

The feed may more preferably comprise particulate matter from tailings including fine and ultra-fine minerals selected from the group consisting of chromite (in the form of $FeCr_2O_4$), magnetite (in the form of $Fe_3O_4$), coal, mineral sands, free gold and cassiterite (in the form of $SnO_2$).

It will be appreciated that upon introduction of the feed into the inverted up-flow separator, particles with a higher specific gravity than the gangue particles will report to the lower column while those with a higher specific gravity compared to the gangue particles will report to the upper column of the inverted up-flow separator, which may be provided with recovered product outlet in the form of an overflow or waste outlet. It will further be appreciated that in some cases particles of the target mineral or the gangue may be misplaced into either of the lower or upper columns. Misplaced target minerals may be scavenged by means of a belt-type magnetic separator.

The inverted up-flow separator of the invention may include a controlled speed positive displacement pump in fluid flow communication with the recovered product outlet of the lower column.

The pump is configured to remove the recovered product from the recovered product outlet in the lower column thereby contributing to a steady up flow fluid (velocity profile) within the lower column. Preferably the controlled speed positive displacement pump operates continuously when the separator is in use.

The at least one working fluid inlet is provided in the lower column.

The at least one working fluid inlet is in fluid flow communication with a fluid supply means, which in turn is in fluid flow communication with an inner volume of the lower column.

Fluid is supplied into the lower column through the at least one working fluid inlet thereby to create an up flow working fluid when the separator has been filled with fluid and is in operation.

The up flow working fluid provides the particulate matter in the lower column with an up-flow velocity, $V_1$, in the lower column and the particulate matter in the upper column with an up-flow velocity of $V_2$. It will be appreciated that the concentration of target mineral to gangue in the particulate matter will be greater in the lower column than the upper column as the target mineral reports to the lower column in the case where the specific gravity of the target mineral is greater than the gangue's specific gravity.

It will be appreciated that where the target mineral has a specific gravity lower than that of the gangue, the target mineral will report to the top of the upper column of the inverted up-flow separator (e.g. where coal is the target mineral).

Due to the configuration of the upper column, the lower column, the connecting member, the working fluid supplied into the lower column and the feed exiting the feed inlet into the volume defined by the connecting member, up-flow velocity $V_1$ is greater than up-flow velocity $V_2$.

It has surprisingly been found that the above configuration and resultant up flow velocities, which is opposite to the up-flow velocities in prior art separators, allows for a more efficient separation of target minerals.

In a form of the invention, the diameter of the upper column to the diameter of the lower column is determined by the desired ratio between up-flow velocity $V_1$ and up-flow velocity $V_2$ ($V_1$:$V_2$). The $V_1$:$V_2$ ratio may lie between 1:0.6 to 1:0.99.

In an embodiment of the invention the fluid is fed into the lower column at a consistent rate and is not adjusted to accommodate for varying concentrations of target mineral and gangue in the particulate matter of the feed.

The working fluid supply means may further be in fluid flow communication with the product outlet of the lower column, wherein the recovered product exiting the product outlet is diluted and lubricated.

The dilution and lubrication of the recovered product with fluid allows for a more consistent outflow of the recovered product from the outlet of the lower column. It also minimises blockages of recovered product at the recovered product outlet in the lower column, which blockages materially affect the stability of the up-flow velocity in the lower column thereby reducing percentage recovery of target minerals in the recovered product which, in turn, results in a reduced concentration of the target minerals to gangue in the recovered product.

The working fluid may be water.

In an embodiment of the invention wherein the target mineral in the feed is chromite ($FeCr_2O_4$), the recovered product will include a concentrate of chromium (III) oxide of at least 40% $Cr_2O_3$, preferably between 40 to 42 percent $Cr_2O_3$, which concentrate makes the recovery of the target mineral commercially viable.

In an embodiment of the invention wherein the recovered product is the target mineral chromite, the recovered product includes between 85 percent concentrate to 98 percent concentrate of the mineral based on the dry mass of the recovered product. Preferably the percent concentrate of the target mineral is from 95 percent to 98 percent.

An advantage of the inverted up-flow separator is thus that the concentrate of the target mineral is obtained in a single pass through the separator of the invention.

According to a second aspect of the invention, there is provided a method for the separation and recovery of target minerals from a feed including particulate matter comprising the target miner particles and gangue particles, the method including the steps of:

(a) providing an inverted up-flow separator comprising:
  a. a feed inlet and a feed outlet;
  b. an upper column, into which the feed outlet extends;
  c. a lower column, having a recovered product outlet;
  d. at least one working fluid inlet;
  wherein the upper column has a wider diameter than a diameter of a lower column;
(b) filling the inverted up-flow separator with fluid;
(c) providing an up-flow working fluid from a fluid supply means in fluid flow communication with the at least one working fluid inlet;
(d) maintaining a consistent up-flow of fluid thereby imparting upon the particulate matter a higher up-flow velocity in the lower column than the up-flow velocity imparted upon particulate matter in the upper column.

The inverted-up flow separator is as herein before described.

According to a third aspect of the invention, there is provided a process for the separation and recovery of target minerals from a feed including particulate matter which comprises target mineral particles and gangue particles, the process including;

(a) classifying the particulate matter into particle size bands using at least one screen and panel to obtain a first recovered product of classified particulate matter including target mineral particles and gangue particles; and
(b) separating the target mineral particles from the gangue particles in the first recovered product using a separator according to the invention to obtain a second recovered product including a higher concentration of target mineral particles to gangue particles.

In an embodiment of the invention, the feed, for classification in step (a), is derived from current or historic tailings. In prior art processes, the tailings would not be further processed and would be treated as waste.

In another embodiment of the invention, the process incudes the steps of:

(a) liberating target minerals from run of mine ore to produce an intermediate product of particulate matter including liberated target mineral particles and gangue particles;

(b) separating and recovering the liberated target mineral particles from the gangue particles of the intermediate product through at least one spiral separator wherein at least some of the smaller sized target mineral particles and gangue particles are not fully recovered by the separation and are sacrificed to tailings;

(c) classifying the tailings of smaller sized target mineral particles into particle size bands using at least one screen and panel to obtain a first recovered product of classified particulate matter including target mineral particles and gangue particles, wherein at least some of the smaller sized target minerals and gangue particles are not fully recovered in the first recovered product; and (d) separating the target mineral particles from the gangue particles in the first recovered product using a separator according to the invention to obtain a second recovered product including a higher concentration of target mineral particles to gangue particles.

The above process wherein the smaller sized target mineral particles have a particle size of between 1000 micrometres to 20 micrometres, preferably between 150 to 20 micrometres.

In an embodiment of the invention, the aperture size of a panel may be anywhere from 10 to 150 micrometres.

In another embodiment of the invention, ultra-fine target mineral particles, having a particle size of less than 20 micrometres, which may not have been recovered through classification, may be separated from the unclassified particulate matter from the classification step (a) above by using a belt-type wet magnetic separator.

In a further embodiment of the process of the invention, target mineral particles not recovered by separation from gangue particles in an overflow or waste stream from the inverted up-flow separator may be recovered by scavenging the target mineral particles with a belt-type wet magnetic separator. Typically, the target mineral particles being scavenged have a particle size of less than 20 micrometres.

DETAILED DESCRIPTION OF THE INVENTION WITH REFERENCE TO THE FIGURES

Figure 1:
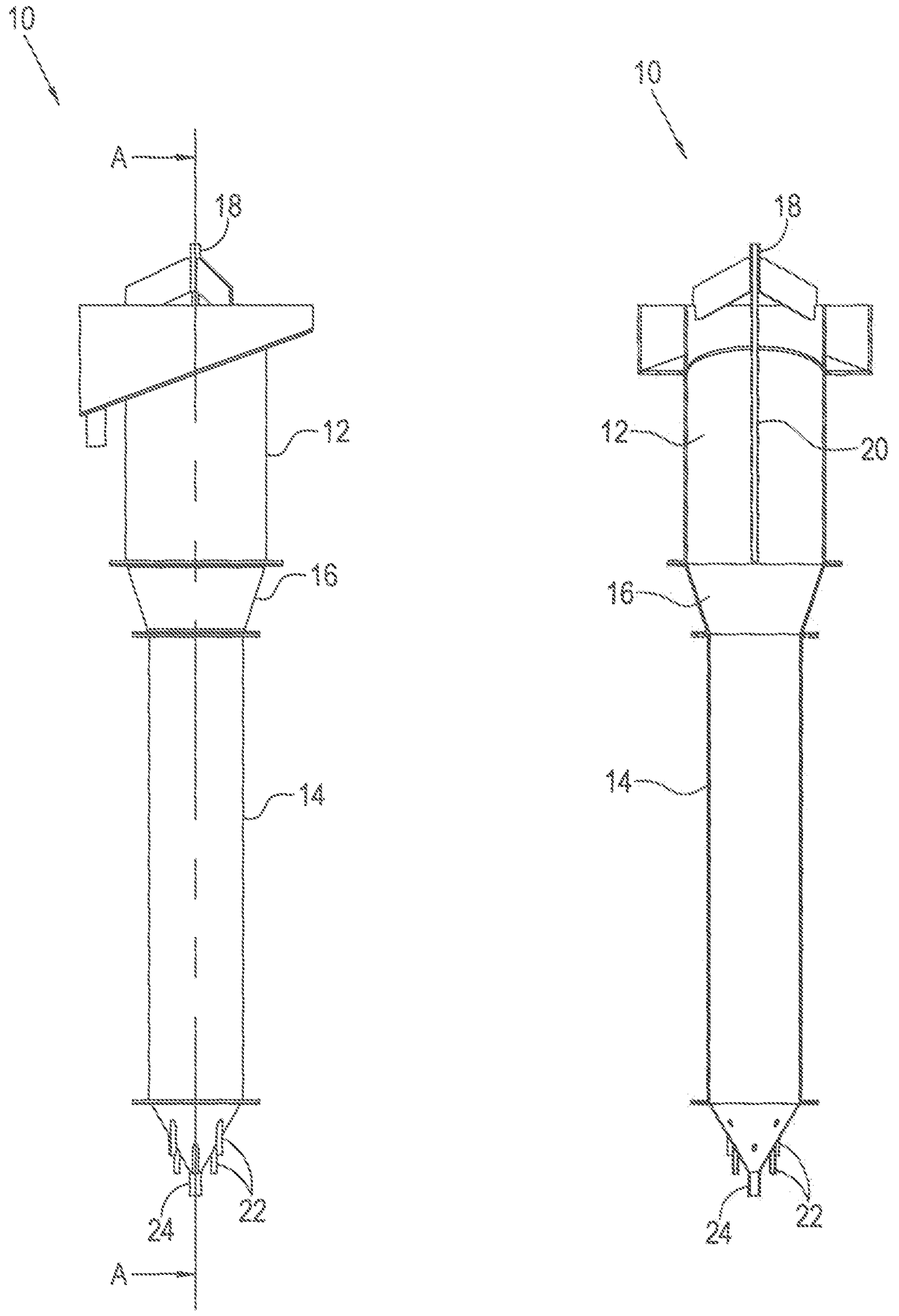
FIG. 1: is a detailed schematic of the up flow inverted separator according to the invention as well as a cut away section A-A of the inverted up-flow separator.

Referring to FIG. 1, an inverted up-flow separator according to the invention is designated by the numeral 10.

The separator (10) is filled with water.

The separator (10) includes an upper column (12) and a lower column (14) that are in fluid flow communication with each other, and which are connected by a connecting member (16). The diameter of the upper column (12) is greater than the diameter of the lower column (14).

The connecting member (16) has a frustoconical shape and defines an inner volume therein.

A feed inlet (18) is provided which has a feed outlet (20) which extends into the upper column (12). The feed outlet (20) terminates at or near an end of the upper column (12) and a beginning of the connecting member (16). It will be appreciated that the position of the feed outlet (20) may be adjusted to achieve an optimal concentration of target mineral in the recovered product (not shown).

A fluid supply means (not shown) pumps fluid into multiple working fluid inlets (22) in the lower column (14) to fluidise the particles of mineral target and gangue thereby creating a working up-flow of fluid. The fluid supply means (not shown) also discharges fluid into the recovered product (not shown) which exits the recovered product outlet (24) in the lower column (14) in order to dilute the recovered product and allow it to run freely from the recovered product outlet (24) to avoid any blockages that may occur.

The source of fine and/or ultra-fine minerals to be recovered using the inverted up-flow separator is tailings. The tailings may be historic or current.

For present purposes, the process of the invention is exemplified with reference to current tailings derived from run of mine ore.

Accordingly, in use, run of mine ore (not shown) is processed to liberate target mineral particles from the ore. The method of liberation is well known to those skilled in the art and may include crushing, grinding and sizing to produce an intermediate product. Unliberated target mineral particles in the ore that do not pass through the aperture size of the screen will be recycled back to the crusher and/or grinder.

The liberated mineral particles and gangue particles are then fed through at least one spiral separator to recover the liberated mineral particles. It will be appreciated that particulate matter including smaller sized target mineral particles and gangue particles (fine and/or ultra-fine minerals) will not all be recovered and will, in prior art processes, be sacrificed to tailings.

Tailings are usually dumped as waste and often times it is not economically feasible to further process the tailings because further processing the tailings is unlikely to yield a recovered product having a sufficient concentration of mineral particles to gangue particles that would make the product commercially viable.

In the present invention however, current tailings including the smaller mineral particles and gangue particles (fine and/or ultra-fine minerals) are classified into particle size bands for separation using the inverted up-flow separator.

The classification takes place using at least one screen and panel, the panel having an aperture size of from 38 to 150 micrometres. Multiple stacked screen and panel configurations may also be used.

The resultant classified product of fine and ultra-fine mineral particles and gangue particles is then fed into the inverted up-flow separator (10), wherein the classified product is fed into the separator (10) through the feed inlet into the upper column.

The feed outlet (20) extends into the upper column (12) as shown in FIG. 1 and the fine and ultra-fine minerals and gangue enter the inner volume defined by the frustoconical connecting member (16).

When the separator (10) is in a steady state, water, which is pumped consistently into the lower column (14) through multiple water inlets (22), creates an up flow working fluid through both columns and the connecting member (16).

Fine and ultra-fine minerals report to the lower column (14) while gangue reports to the upper column (12). Where some of the fine and ultra-fine minerals get misplaced into the upper column (12), these will eventually report to the lower column (14), as the up-flow velocity $V_2$ of particles in the upper column (12) is lower than the up flow velocity $V_1$ in the lower column (14).

In order to prevent the build-up of recovered product at the recovered product outlet (24) of the lower column (14) water from the water supply means that supplies water to the multiple inlets in the lower column is also fed into the recovered product in order to dilute it thereby increasing its fluid flow properties.

The recovered product may then be further processed.

The invention will now be described with reference to the following non limiting examples:

EXAMPLE

Figure 2:
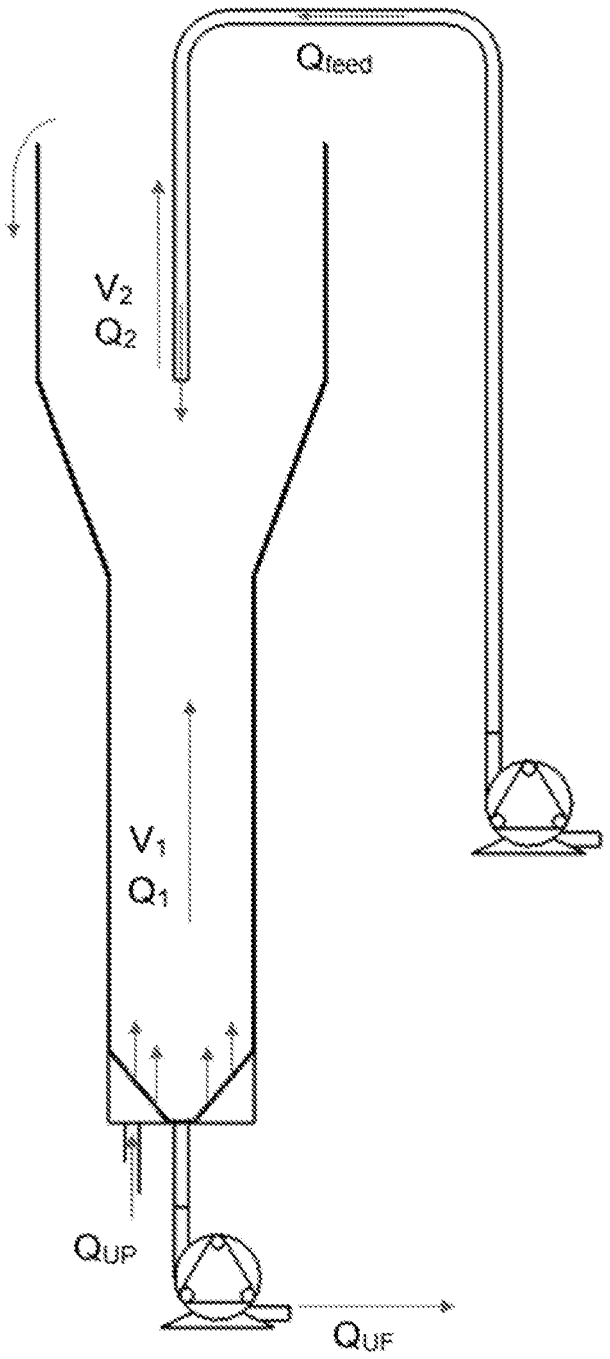
FIG. 2: is a simplified diagram of the up flow inverted separator.

For purposes of this example, and with reference to FIG. 2:

$V_1$ Fluid velocity in lower column (cm/h)
$V_2$ Fluid velocity in upper column (cm/h)
$V_2/V_1$ Dynamic Ratio
$A_1$ Cross-sectional area of lower column ($m^2$)
$A_2$ Cross-sectional area of upper column ($m^2$)
$A_2/A_1$ Static ratio
$R_u$ Upper column radius (m)
$D_u$ Upper column diameter (m)
$R_l$ Lower column radius (m)
$D_l$ Lower column diameter (m)
$Q_l$ Volumetric flow rate lower column (l/h)
$Q_u$ Volumetric flow rate upper column (l/h)
$Q_{feed}$ Feed volumetric flow rate (l/h)
$Q_{UF}$ Underflow volumetric flow rate (l/h)
$Q_{UP}$ Up-flow volumetric flow rate—water box (l/h)

For purposes of this example it is assumed that the feed material has been classified to, nominally, 38 µm-63 µm and has a head-grade of 20% $Cr_2O_3$. The operational parameters given in table 1 hereunder result in 41% $Cr_2O_3$ with a recovery of 85%. Recovery is defined below as $$\text{recovery} = \frac{\text{product grade} \times \text{product mass}}{\text{feed grade} \times \text{feed mass}}$$

The cross-sectional areas of the upper column are related according to the static ratio defined as:

$$\text{static ratio} = \frac{A_2}{A_1}$$

The velocities $V_1$ and $V_2$ were optimised empirically. The length of the lower column, for purposes of this example, was 1000 mm whilst the length of the upper column was 550 mm.

Table 1 gives the operational parameters as well as critical separator dimensions for this example.

TABLE 1

| Operational Parameters | | |
|---|---|---|
| $V_2$ | 154 | (cm/h) |
| $V_1$ | 220 | (cm/h) |
| $V_2/V_1$ | 0.7 | |
| $A_2$ | 0.071 | ($m^2$) |
| $A_1$ | 0.018 | ($m^2$) |
| $A_2/A_1$ | 4 | |
| $R_u$ | 0.15 | (m) |
| $D_u$ | 0.3 | (m) |
| $R_l$ | 0.075 | (m) |
| $D_l$ | 0.15 | (m) |
| $Q_l$ | 38.9 | (l/h) |
| $Q_u$ | 108.9 | (l/h) |
| $Q_{feed}$ | 70 | l/h) |
| $Q_{UF}$ | 11.7 | (l/h) |
| $Q_{UP}$ | 50.5 | (l/h) |

It will be appreciated that the above is merely an example and that the separation and recovery of target minerals may take place in a different manner without departing from the spirit and scope of the invention. For example, target minerals need not be recovered from tailings emanating from run of mine ore. It may also not be necessary to engage in the crushing, grinding, sizing and separation using spiral separators and that the apparatus according to the invention may be used as a one pass separator to render a commercially viable recovered product.

The invention claimed is:

1. An inverted up-flow separator for the separation and recovery of target minerals, selected from the group consisting of fine and ultra-fine minerals, from a feed including particulate matter which comprises target mineral particles and gangue particles, the inverted up-flow separator including:

(a) at least one working fluid inlet; an upper column; a feed inlet, for a feed including particulate matter which comprises target mineral particles and gangue particles, into the upper column; a lower column; a recovered product outlet; the upper column and lower column being in fluid flow communication with each other; a connecting member, connecting the upper column and lower column; and wherein:

(b) the feed inlet has a feed outlet, the position at which the feed outlet terminates, in the inverted up-flow separator, being adjustable to optimise the discharge of feed in the inverted up-flow separator, (c) the upper column has a greater diameter than a diameter of the lower column; and (d) the upper column and lower column are configured and dimensioned such that upon introduction of an up-flow working fluid into the lower column, through the at least one working fluid inlet, the particulate matter in the inverted up-flow separator, when filled with fluid, is fluidised thereby imparting a first up-flow velocity ($V_1$) to the particulate matter in the lower column and a second up-flow velocity ($V_2$) to the particulate matter in the upper column, wherein the first up-flow velocity ($V_1$) is greater than the second up-flow velocity ($V_2$) and wherein the ratio of the first up-flow velocity ($V_1$) imparted to the particulate matter in the lower column to the second up-flow velocity ($V_2$) imparted to the particulate matter in the upper column is between 1:0.6 to 1:0.8.

2. The inverted up-flow separator of claim 1, wherein the connecting member is frustoconical in shape and defines an inner volume between the upper column and the lower column to which it is connected.

3. The inverted up-flow separator of claim 2, wherein the feed inlet has a feed outlet, the feed outlet terminating at or near where the connecting member and upper column meet and wherein the feed is discharged into the inner volume defined by the frustoconical shaped connecting member.

4. The inverted up-flow separator of claim 1, wherein the recovered product outlet is at the bottom end of the lower column for recovered target mineral particles having a higher specific gravity than the gangue particles.

5. The inverted up-flow separator of claim 1, wherein the recovered product is an outflow outlet at or near the top end of the upper column for recovered target mineral particles having a lower specific gravity than the gangue particles.

6. A method for the separation and recovery of target minerals from a feed including particulate matter which comprises target mineral particles and gangue particles, the method including the steps of:

(a) using an inverted up-flow separator as claimed in claim 1, wherein the inverted up-flow separator is filled with fluid;

(b) introducing the feed comprising target mineral particles and gangue particles, into an upper column of the inverted up-flow separator;

(c) providing an up-flow working fluid from a fluid supply means in fluid flow communication with the at least one working fluid inlet of the inverted up-flow separator; and (d) maintaining a consistent up-flow of fluid thereby imparting upon the particulate matter a higher up-flow velocity in a lower column of the inverted up-flow separator than the up-flow velocity imparted upon particulate matter in the upper column.

7. The method of claim 6, wherein the target mineral particles have at least partially been liberated through one or more processes selected from crushing, grinding and sizing.

8. The method of claim 6, wherein the feed is sourced from tailings which include target mineral particles and gangue particles from a preceding inefficient separation of liberated target mineral particles and gangue particles.

9. The method of claim 8, wherein the feed includes particulate matter from tailings of fine and ultra-fine minerals selected from the group consisting of chromite (in the form of $FeCr_2O_4$), magnetite (in the form of $Fe_3O_4$), coal, mineral sands, free gold and cassiterite (in the form of $SnO_2$).

10. A process for the separation and recovery of target minerals from a feed including particulate matter which comprises target mineral particles and gangue particles, the process including:

(a) classifying the particulate matter into particle size bands using at least one screen and panel to obtain a first recovered product of classified particulate matter including target mineral particles and gangue particles; and (b) separating the target mineral particles from the gangue particles in the first recovered product using the separator of claim 1 to obtain a second recovered product including a higher concentration of target mineral particles to gangue particles.

11. The process of claim 10, wherein the panel includes apertures sized from between 10 micrometres to 150 micrometres.

12. A process for the separation and recovery of target minerals from a feed including particulate matter which comprises target mineral particles and gangue particles, the process comprising:

(a) liberating target minerals from run of mine ore to produce an intermediate product of particulate matter including liberated target mineral particles and gangue particles;

(b) separating and recovering the liberated target mineral particles from the gangue particles of the intermediate product through at least one spiral separator wherein at least some of the smaller sized target mineral particles and gangue particles are not fully recovered by the separation and are sacrificed to tailings;

(c) classifying the tailings of smaller sized target mineral particles into particle size bands using at least one screen and panel to obtain a first recovered product of classified particulate matter including target mineral particles and gangue particles, wherein at least some of the smaller sized target minerals and gangue particles are not fully recovered in the first recovered product; and (d) separating the target mineral particles from the gangue particles in the first recovered product using a separator according to claim 1 to obtain a second recovered product including a higher concentration of target mineral particles to gangue particles.

13. The process of claim 12, wherein ultra-fine mineral particles having a particle size of less than 20 micrometres, not being part of the first recovered product, are subjected to further separation from gangue particles by means of a belt-type wet magnetic separator.

14. The process of claim 12, wherein ultra-fine mineral particles having a particle size of less than 20 micrometres, not being part of the second recovered product, are scavenged by means of a belt-type wet magnetic separator.

* * * * *